United States Patent
Mach et al.

(10) Patent No.: US 10,647,062 B2
(45) Date of Patent: May 12, 2020

(54) METHOD FOR HEATING MULTIPLE PILES OF A LAMINATE

(71) Applicant: ELOPAK AS, Spikkestad (NO)

(72) Inventors: Martin Mach, Touskov (CZ); Thomas Böhme, Dresden (DE); Sebastian Mikulski, Hannover (DE)

(73) Assignee: ELOPAK AS, Spikkestad (NO)

( * ) Notice: Subject to any disclaimer, the term of this patent is extended or adjusted under 35 U.S.C. 154(b) by 482 days.

(21) Appl. No.: 15/312,893

(22) PCT Filed: May 13, 2015

(86) PCT No.: PCT/EP2015/060690
§ 371 (c)(1),
(2) Date: Nov. 21, 2016

(87) PCT Pub. No.: WO2015/177036
PCT Pub. Date: Nov. 26, 2015

(65) Prior Publication Data
US 2017/0182702 A1    Jun. 29, 2017

(30) Foreign Application Priority Data
May 21, 2014    (DE) .................. 10 2014 107 157

(51) Int. Cl.
*B29C 65/04*    (2006.01)
*B29C 65/00*    (2006.01)
(Continued)

(52) U.S. Cl.
CPC .............. *B29C 65/04* (2013.01); *B29C 65/30* (2013.01); *B29C 66/0342* (2013.01);
(Continued)

(58) Field of Classification Search
CPC .............. B29C 65/04; B29C 66/91653; B29C 66/1122; B29C 65/30; B65B 51/144
See application file for complete search history.

(56) References Cited

U.S. PATENT DOCUMENTS

| 2,434,325 A | 1/1948 | Le Vesconte |
| 3,450,856 A | 6/1969 | Buck et al. |
| (Continued) | | |

FOREIGN PATENT DOCUMENTS

| CN | 1960853 A | 5/2007 |
| DE | 21 39 900 A1 | 4/1973 |
| (Continued) | | |

OTHER PUBLICATIONS

Machine translation of DE2139900.*
International Bureau, International Preliminary Report on Patentability, dated Nov. 22, 2016, 11 pgs.

*Primary Examiner* — Christopher T Schatz
(74) *Attorney, Agent, or Firm* — Lucas & Mercanti, LLP

(57) ABSTRACT

A method and a device for heat sealing multiple plies of a laminate from which gable top packaging can be produced, wherein the laminate has a carrier layer made of electrically non-conductive material and a sealing layer made of thermoplastic material on at least one surface of the laminate. To heat seal multiple plies of a laminate in a high-frequency alternating electric field, the alternating electric field is generated by a first lead of an HF voltage supply in a first sub-region of the sealing region and is generated by a second lead of the HF voltage supply, differing from the first lead, in at least a second sub-region of the sealing region, so that a different heat distribution is obtained over the sub-regions of the sealing region.

7 Claims, 12 Drawing Sheets

(51) Int. Cl.
*B65B 51/22* (2006.01)
*B65B 51/14* (2006.01)
*B29C 65/30* (2006.01)
*B29L 31/00* (2006.01)
*B29C 65/36* (2006.01)
*B29C 65/18* (2006.01)
*B29C 65/72* (2006.01)
*B29K 101/12* (2006.01)

(52) U.S. Cl.
CPC ........ *B29C 66/1122* (2013.01); *B29C 66/347* (2013.01); *B29C 66/3462* (2013.01); *B29C 66/43122* (2013.01); *B29C 66/72328* (2013.01); *B29C 66/73921* (2013.01); *B29C 66/81425* (2013.01); *B29C 66/81435* (2013.01); *B29C 66/81811* (2013.01); *B29C 66/8242* (2013.01); *B29C 66/8322* (2013.01); *B29C 66/8432* (2013.01); *B29C 66/91651* (2013.01); *B29C 66/91653* (2013.01); *B65B 51/144* (2013.01); *B65B 51/22* (2013.01); *B29C 65/18* (2013.01); *B29C 65/368* (2013.01); *B29C 65/3656* (2013.01); *B29C 65/3668* (2013.01); *B29C 65/72* (2013.01); *B29C 66/71* (2013.01); *B29C 66/72321* (2013.01); *B29C 66/91221* (2013.01); *B29K 2101/12* (2013.01); *B29L 2031/7166* (2013.01)

(56) References Cited

U.S. PATENT DOCUMENTS

| | | | |
|---|---|---|---|
| 4,060,443 | A | 11/1977 | Balla |
| 4,895,457 | A | 1/1990 | Lancaster |
| 7,346,525 | B1 | 3/2008 | Kupfer et al. |
| 2002/0079121 | A1* | 6/2002 | Ryan .................. C09D 167/00 174/68.1 |
| 2004/0151481 | A1* | 8/2004 | Cassoli .................. B29C 65/10 392/379 |
| 2006/0198975 | A1 | 9/2006 | Kikuchi |
| 2008/0053612 | A1 | 3/2008 | Rogeberg |

FOREIGN PATENT DOCUMENTS

| | | |
|---|---|---|
| DE | 23 24 810 A1 | 12/1973 |
| EP | 2 383 188 A1 | 11/2011 |
| JP | S4819743 B | 6/1973 |
| JP | S56141103 U | 10/1981 |
| JP | H08 58739 A | 3/1996 |
| JP | H08151032 A | 6/1996 |
| JP | 2000168737 A | 6/2000 |
| JP | 2004262048 A | 9/2004 |
| JP | 2006503762 A | 2/2006 |
| WO | 2013093505 A2 | 6/2013 |

\* cited by examiner

METHOD FOR HEATING MULTIPLE PILES OF A LAMINATE

CROSS-REFERENCE TO RELATED APPLICATIONS

This application is a 371 of PCT/EP2015/060690 filed May 13, 2015, which in turn claims the priority of DE 10 2014 107 157.3 filed May 21, 2014, the priority of both applications is hereby claimed and both applications are incorporated herein by reference.

BACKGROUND OF THE INVENTION

The invention pertains to a method a device for heat-sealing multiple plies of a laminate, wherein the laminate comprises a carrier layer of electrically nonconductive material and a sealing layer of thermoplastic material on at least one surface of the laminate.

For packages containing liquid food products, laminates comprising a carrier layer of electrically nonconductive material, especially paper or cardboard, and a sealing layer of thermoplastic material, especially a thermoplastic such as polyethylene or polypropylene, are frequently used as packaging material. The thermoplastic material is liquid-tight and resistant to fat-containing substances and acids. In addition, the thermoplastic material can be heat-sealed by placing opposing sealing layers of thermoplastic material against each other and by welding them together by the application of heat in a sealing region at the same time that multiple plies of the laminate are being pressed together.

The heat for the heat-sealing process is conducted from the outside, through the plies of the laminate, to the inner sealing layers. Because the packages must be sealed very quickly in modern packaging machines, it can be difficult to supply enough heat.

If the laminate comprises a metal layer, especially a layer of aluminum, the heat for heat-sealing can be generated by induction, in that coils are incorporated into the pressing bars which compress the plies of the laminate; these coils induce electrical currents in the metal ply of the laminate and thus heat it. The heat is carried by conduction from the heated metal ply to the adjacent plies of thermoplastic material, which is melted by the heat and thus converted to a fluid state.

To an increasing extent, laminates for packages are being used which, even though they do not have a metal layer, are gas-tight and have flavor-preserving properties. There is therefore a need to generate heat effectively in the laminate for the heat-sealing process even in the absence of a metal layer. DE 23 24 810 proposes that the heat be generated by the dielectric losses which occur when the laminate is exposed to a high-frequency alternating electric field on the order of 300-600 MHz in the sealing region. The lost heat is based in particular on an orientation polarization of molecules with dipole properties in the electrically nonconductive material of the carrier layer of the laminate. In addition to the orientation polarization, ions and electrons also become polarized in the alternating electric field.

So that they can be heated, the plies of the laminate must be exposed to the high-frequency alternating field between an electrode and a counterelectrode in the sealing region. The two electrodes form a capacitor, wherein the electrically nonconductive material of the laminate forms the dielectric.

The heat-sealing process in a high-frequency alternating electric field is determined by the following parameters: the sealing time, the pressure applied to the plies in the sealing region, the material properties of the laminate to be sealed, the size of the facing surfaces of the electrode and counterelectrode, the gap between these surfaces, and the power level of the HF voltage supply.

The most important material properties are in particular the relative permittivity and the loss factor of the laminate. The relative permittivity of the laminate describes the extent to which the capacitance of the capacitor formed by the electrode and counterelectrode increases when the gap between the electrodes is filled by the laminate, as dielectric, instead of air. The loss factor tan a is also a physical material property of the laminate. To generate sufficient heat through dielectric losses, the loss factor tan a should be on the order of $>0.01$.

It is a problem for the heat-sealing process in a high-frequency alternating electric field that the number of plies of the laminate in the sealing region can vary. If, for example, beverage containers designed as gable top packages are to be heat-sealed to seal the gable after the container has been filled, the laminate of conventional package blanks has four plies in the lower part of the sealing region and as many as five plies in an overlap region, whereas the laminate has only two facing plies in the upper part of the sealing region. Because of the short sealing time required, it is possible, in the case of gable top packages of this type, that the heat-sealing is not sufficient in the lower part of the sealing region and/or that overheating occurs in the upper part of the sealing region As a result, the seal of the package can be leaky, which is not acceptable with respect to the shelf life of the contents.

BRIEF SUMMARY OF THE PRESENT INVENTION

Against the background of this prior art, the goal of the invention is to create a method and a device for heat-sealing multiple plies of a laminate in a high-frequency alternating electric field, according to which the problems caused by either too much or too little heat input into the plies of the laminate to be sealed are avoided.

The achievement of this goal is based on the realization that, in the interests of short cycle times, the parameters of the heat-sealing process, namely, applied pressure, sealing time, gap between the electrodes, and size of the facing surface areas of the electrodes which generate the high-frequency alternating electric field, cannot in practice be changed. The sealing time for sealing the package is as short as possible, and the applied pressure is as high as possible. The sealing region and thus the size of the electrodes and the gap between them are largely determined by the arrangement and number of laminate plies to be heat-sealed such as in the area of the gable of the package, for example.

Nevertheless, to avoid the problems caused by a quantitatively incorrect heat input, it is proposed for a method of the type described above that the alternating electric field be generated in a first subregion of the sealing region at a first power level of the HF voltage supply and in at least one second subregion of the sealing region at a second power level of the HF voltage supply different from the first power level, so that the heat is distributed over the subregions of the sealing region in a differentiated manner. The differentiated heat distribution over the subregions allows a targeted adaptation to the amount of heat required in the associated subregions. The subregions are arranged, for example, one above the other in the vertical direction and separated from each other in the horizontal direction.

So that the alternating electric field can be generated at different power levels in the subregions of the sealing region, a device for heat-sealing of the type described above comprises a sealing element comprising at least one first and at least one second electrode; a second sealing element, which comprises at least one counterelectrode; a sealing region arranged between the electrodes and the at least one counterelectrode for heat-sealing the plies of the laminate; a drive for producing relative movement of the sealing elements with respect to each other and to build up an applied pressure on the plies of the laminate in the sealing region; and a high-frequency voltage supply, which is set up in such a way that the level of the voltage present at the first electrode and the at least one counterelectrode differs from the level of the voltage present at the second electrode and the at least one counterelectrode. To generate the different voltage levels, the high-frequency voltage supply can also be set up in such a way that the frequency present at the first electrode and the at least one counterelectrode differs from the frequency present at the second electrode and the at least one counterelectrode.

A differentiated heat distribution in the subregions of the sealing region can be necessary when the number of plies of the laminate to be heat-sealed in the first subregion differs from that in the second subregion, as occurs, for example, in the case of the heat-sealing of gable top packages. In addition, the need for a differentiated heat distribution over the subregions of the sealing region can arise from the fact that the laminates to be heat-sealed are of different thicknesses in the various subregions.

The differentiated power levels for generating the alternating electric fields in the subregions of the sealing region are preferably determined as a function of the number and/or thickness of the plies of the laminate which are to be heat-sealed in the subregion in question. In the subregion in which the heat-sealing must be carried out through a larger number of plies of the laminate, a higher power level for generating the alternating field is required than in the subregion in which the heat-sealing must be carried out through a smaller number of plies of the laminate.

The power level for generating the alternating electric field in the subregion in question can be controlled not only as a function of the number and/or thickness of the plies but also as a function of a temperature determined in each subregion during the heat-sealing process. The temperature in the heat-sealing region is the key factor with respect to the melting of the heat-sealing layer(s). By targeted measurement of the temperature in the subregions, the power level for generating the alternating electric field can be controlled even more accurately, and thus the quality of the heat-sealing in the entire sealing region can be improved.

During heat-sealing, the thickness of the laminates to be sealed decreases. To avoid a change in the sealing parameter "applied pressure" as a result of the decrease in thickness, in an advantageous embodiment of the invention the force used to press the plies of the laminate together during heat-sealing is kept constant. For this purpose, the drive of the pressing bars is equipped with force control.

The high-frequency alternating electric field in the sealing region is generated for only a short time during the heat-sealing process. No alternating electric field is generated in the sealing region during a post-pressing and cooling phase.

Differences in the pressure applied to the various subregions of the sealing region can lead to different degrees of heating; to avoid this, the pressure by which the plies of the laminate are pressed together should preferably the same in each subregion of the sealing region. So that the same pressure can be applied in all sealing regions while the applied force remains constant, the distance between the force-actuated electrodes in the subregions of the sealing region can be different. In subregions where a larger number of laminate plies is to be heat-sealed, the distance between the electrode and the counterelectrode will then be greater than in the subregions of the sealing region where a smaller number of plies is to be heat-sealed.

To obtain the required sealing heat within a short time, the high-frequency alternating electric field is preferably generated in a frequency band between 3 MHz and 300 MHz. In the frequency band just cited, the standard frequencies usually used are 13.56 MHz, 27.12 MHz, and 40.68 MHz. The three just-mentioned frequencies are reserved for industrial, scientific, and medical purposes. Frequencies lying above the standard frequency of 40.68 MHz are advisable especially for materials with a low loss factor, so that the power necessary for rapid heat-sealing can nevertheless be made available.

The high-frequency voltage supply necessary to implement the method is set up at the given frequency in such a way that the level of the HF voltage present at the first electrode and the at least one counterelectrode differs from the level present at the second electrode and the at least one counterelectrode. This results in different power levels, which generate the alternating electric fields in the subregions of the sealing region. To generate the different power levels, as previously mentioned, the frequency present at the first electrode and the at least one counterelectrode can also be different from the frequency present at the second electrode and the at least one counterelectrode.

The high-frequency voltage supply comprises an HF generator for generating a high-frequency voltage. The HF generator is electrically connected to each counterelectrode on the second sealing element and to each first or each second electrode on the first sealing element preferably by means of low-loss, shielded lines. Low-loss, shielded lines which can be used include in particular coaxial cables with an impedance of 50Ω. The impedance is made up of the ohmic resistance of the line and the capacitive resistance, which depends on the frequency of the HF generator. An impedance of 50Ω is used most often in high-frequency engineering.

This impedance is considered a good compromise between the demand for a high HF power transfer and the demand for low damping. For this reason, the HF generator preferably also comprises an output impedance of 50Ω. By means of an adapter section, the load impedance, formed by the electrodes and the plies of the laminate to be sealed, are adapted to the output impedance of the HF generator.

If the HF generator of the high-frequency voltage supply is electrically connected to the first electrode, the HF voltage present between the second electrode and the at least one counterelectrode can be reduced by connecting the second electrode capacitively to the first electrode.

If the HF generator of the high-frequency voltage supply is electrically connected to the second electrode, the HF voltage present between the first electrode and the at least one counterelectrode can be increased by connecting the first electrode inductively to the second electrode.

In a third embodiment of the high-frequency voltage supply, the HF generator is adapted to generate at least two high-frequency voltages which are different from each other, wherein one output of the HF generator is electrically connected to the at least one counterelectrode; an output with the lower HF voltage is electrically connected to the second electrode; and the output with the higher HF voltage is electrically connected to the first electrode.

In one embodiment of the invention, each electrode of the first sealing element is opposed by a separate counterelectrode in such a way that in each case two electrode surfaces of equal area are located a certain distance away from, and parallel to, each other.

In one embodiment of the invention, a subregion of the surface of the first and/or of the second electrode and/or of the counterelectrode which can be brought into contact with at least one laminate has a surface structure which is not smooth. This structuring can take the form of, for example, a vertical grooving of a subregion of the electrodes. The structuring has both a mechanical and an electrical effect. Mechanically, the structuring has the effect that the material of the laminate to be sealed penetrates into the recesses of the structuring, especially into the grooves. Electrically, the structuring has the effect of creating a local increase in the intensity of the generated alternating field. Subregions of the surface of an electrode are structured in particular in cases where an even greater local increase in power is required in certain subregion of the sealing area so that, for example, five plies of the laminate can be heat-sealed instead of four. A local increase in the applied force resulting from the larger number of plies is largely avoided by the mechanical effect of the structuring.

The first and second sealing elements comprise pressing bars, between which the plies of the laminate are pressed together. One of the pressing bars is preferably static, whereas the other pressing bar is preferably configured to be movable relative to the static bar.

The first and second electrodes are preferably arranged vertically one above the other and separated from each other horizontally. For the purpose of compensating for differences in the number of laminate plies to be heat-sealed, the upper electrode preferably extends farther toward the counterelectrode than the electrode arranged under it does.

BRIEF DESCRIPTION OF THE DRAWINGS

Several first and several second electrodes can be arranged on the first sealing element, so that a plurality of gable top containers can be sealed simultaneously.

The invention is explained in greater detail below on the basis of the figures:

FIG. 1b shows a side view of the sealing elements of FIG. 1a;

FIG. 2b shows a side view of the sealing elements of FIG. 2a;

DETAILED DESCRIPTION OF THE PREFERRED EMBODIMENTS

A device 10 for heat-sealing multiple plies of a laminate, only part of which is visible in FIG. 1, comprises a first, movable sealing element 20 and a second, static sealing element 30 opposite the first sealing element 20.

Figure 1A:
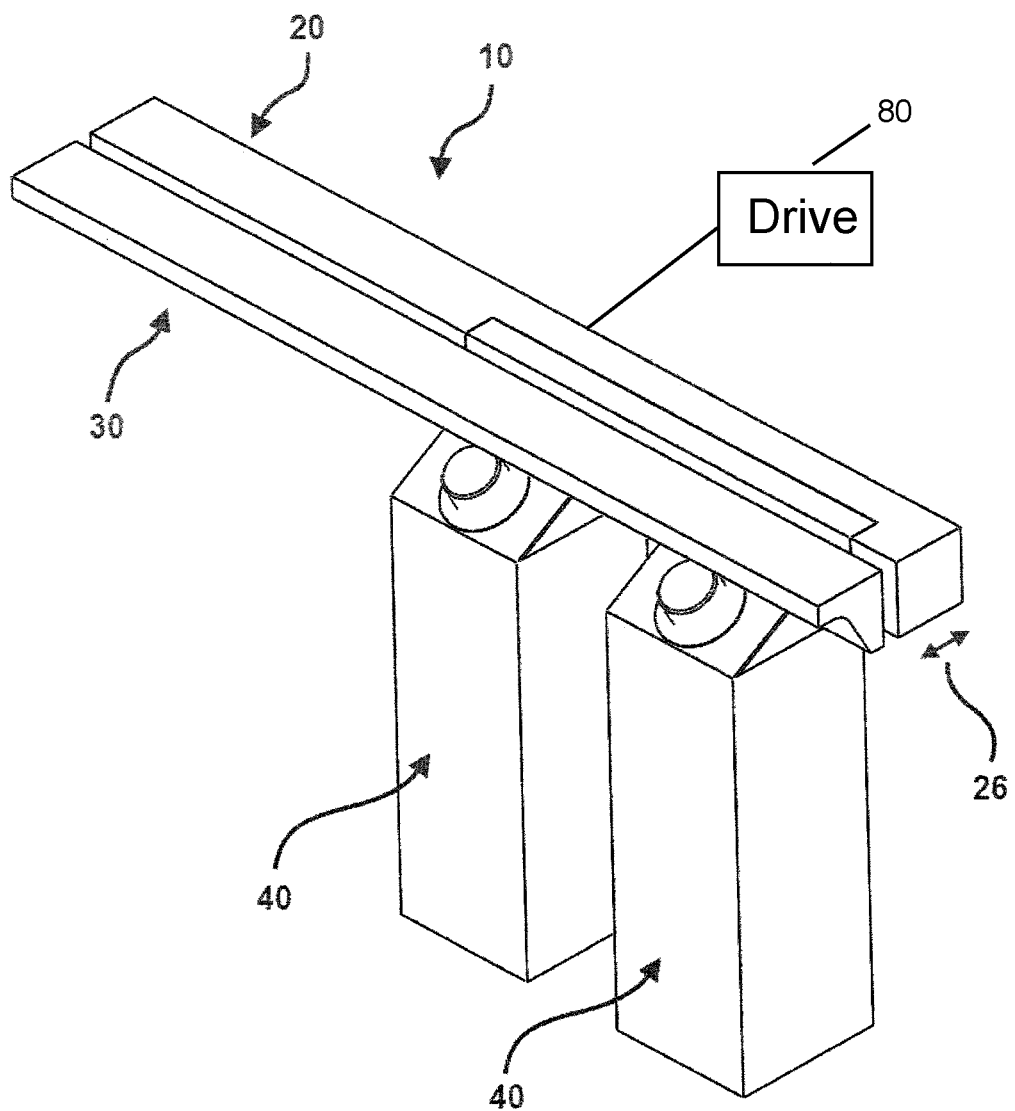
FIG. 1a shows a perspective view of a first and a second sealing element of a device for heat-sealing multiple plies of a laminate of a gable top package.
Figure 1B:
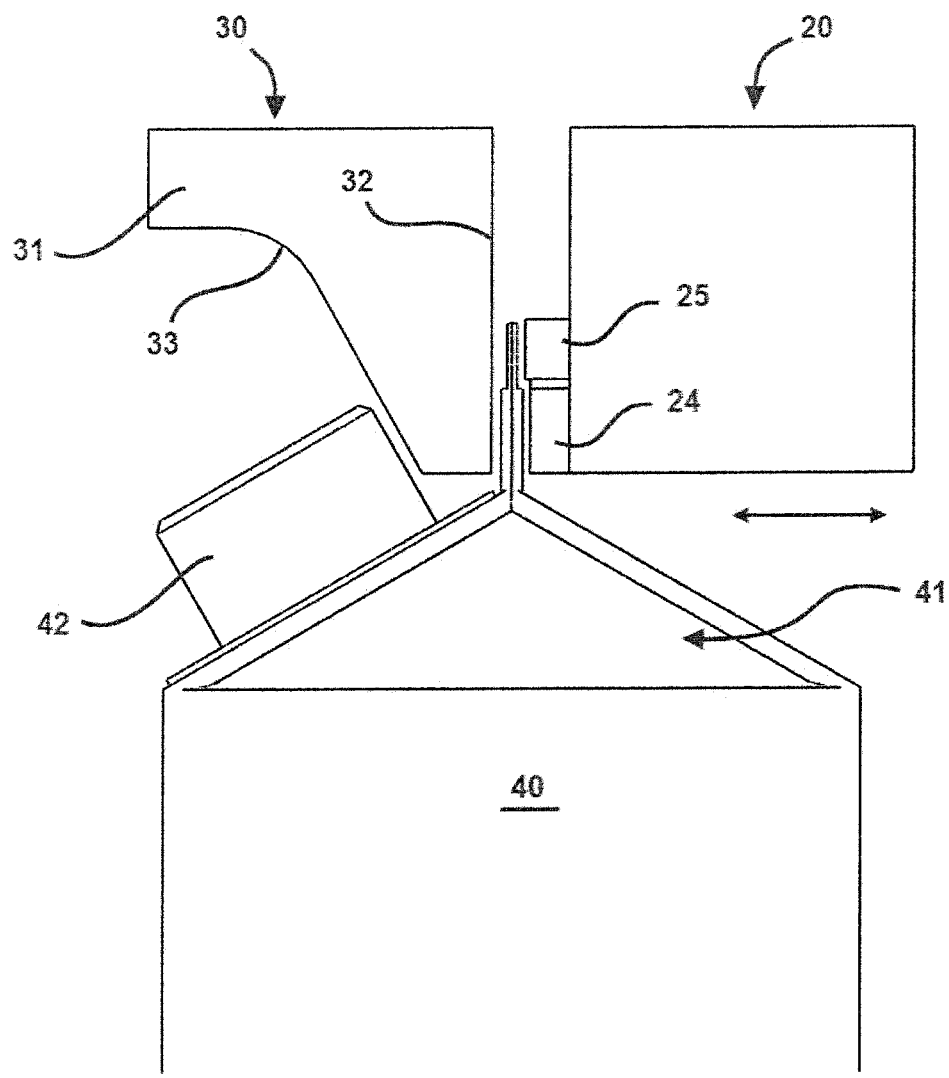
Figure 1C:
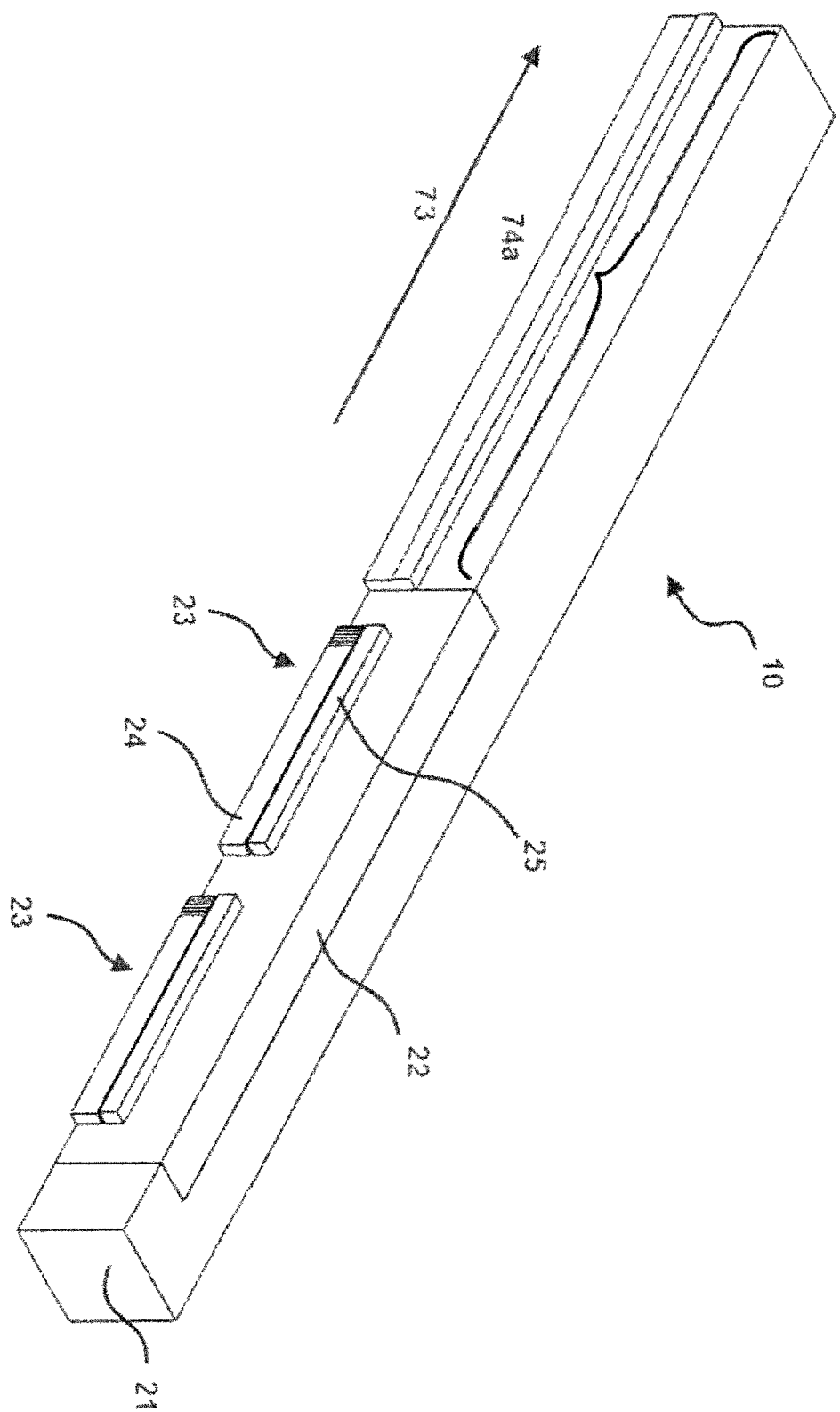
FIG. 1c shows a perspective view of the first sealing element in illustration of the arrangement of the electrodes.
Figure 1D:
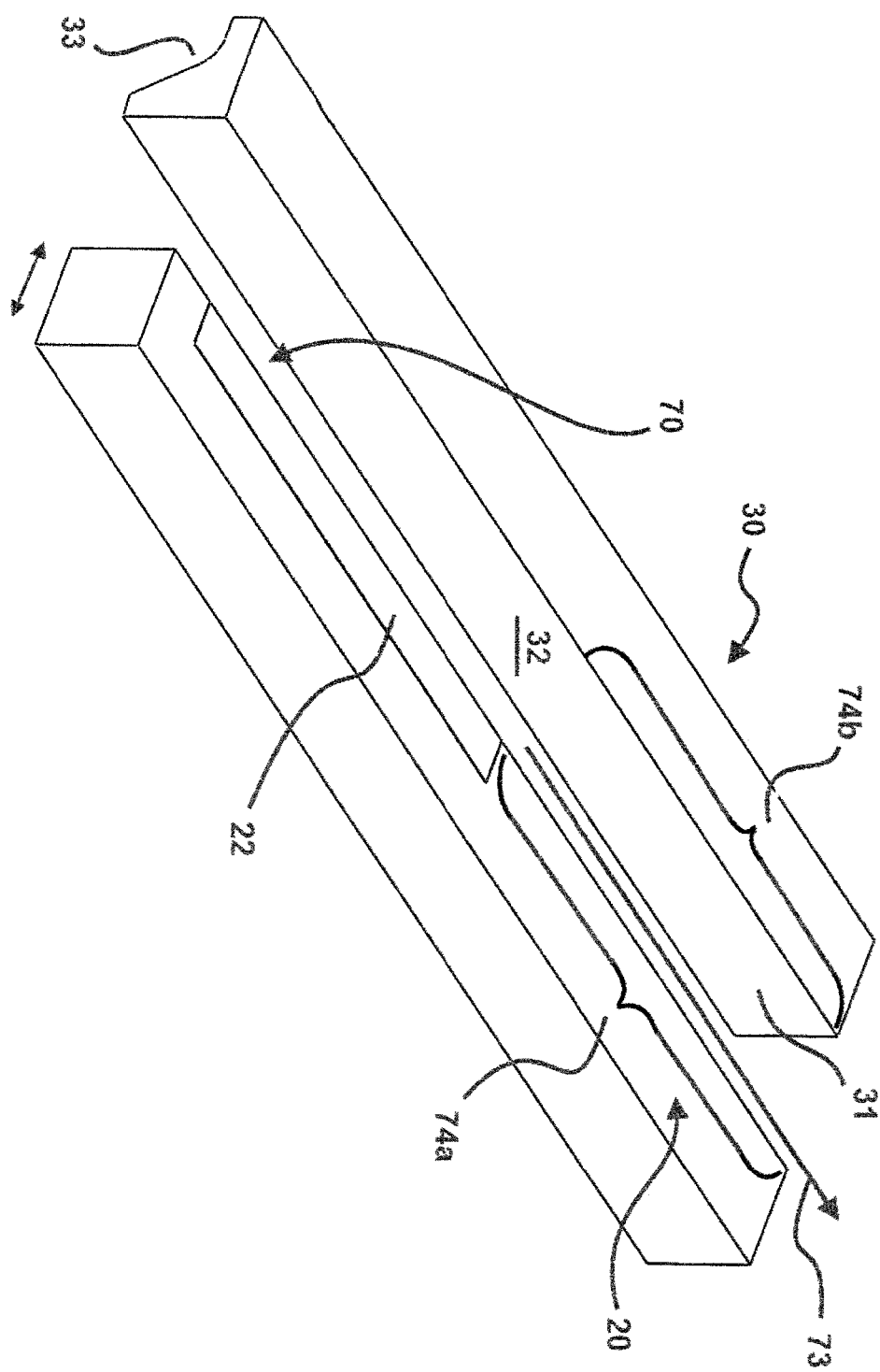
FIG. 1d shows a perspective view of the first and second sealing elements from a different angle.

The first sealing element 20, as can be seen in FIG. 1c, comprises a cylindrical pressing bar with a rectangular cross section that is constant along a length of the bar. The pressing bar is made of stainless steel, for example, in the right half of which, as seen in FIG. 1c, a holder 22 of electrically insulating material is inset. On the holder 22, two electrode pairs 23 are arranged next to each other in the longitudinal direction of the pressing bar 21. Each electrode pair 23 is formed by a lower, first electrode 24 and an upper, second electrode 25 above the first. It is also possible for an insulating plate (not shown in the figures) to be arranged between the electrodes 24, 25 and the holder 22. This insulating plate protects the holder 22 from short-circuits and facilitates the maintenance of the first sealing element 10. The holder 22 consists of, for example, polyether ether ketone (PEEK) material.

A linear drive 80 (shown schematically in FIG. 1) is especially well adapted to the production of the movement 26 of the first sealing element 20 relative to the static, second sealing element 30 and to build up an applied force; the drive 80 is set up in such a way that the first sealing element 20 can be moved toward the second sealing element 30 and away from the second sealing element 30. A drive operated by a pressure medium is especially suitable, in particular a pneumatic cylinder. The second sealing element 30 is formed by a cylindrical bar 31 that has a constant cross section along a length of the bar and is composed of material of high electrical conductivity such as stainless steel. The body 31 forms, as a whole, the counterelectrode 32 opposing the first and second electrodes 24, 25 of the first sealing element 20. The cylindrical body 31 comprises, on its bottom surface, a recess 33, which, during the heat-sealing of the gable of a gable top package 40, gives room for a closure element 42 arranged on the gable 41.

Figure 2A:
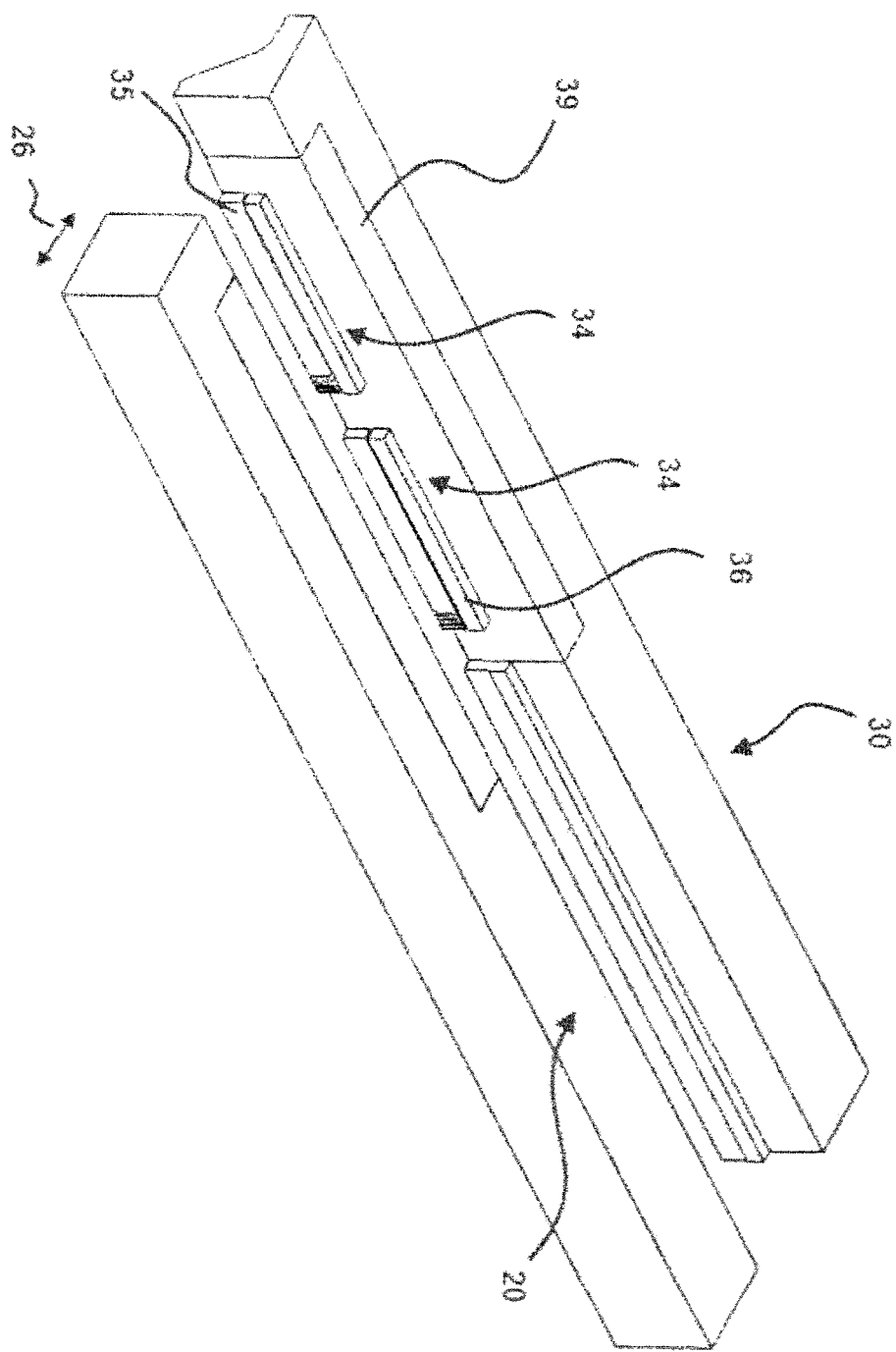
FIG. 2a shows a perspective view of a first and a second sealing element of a second embodiment of a device for heat-sealing multiple plies of a laminate of a gable top package.
Figure 2B:
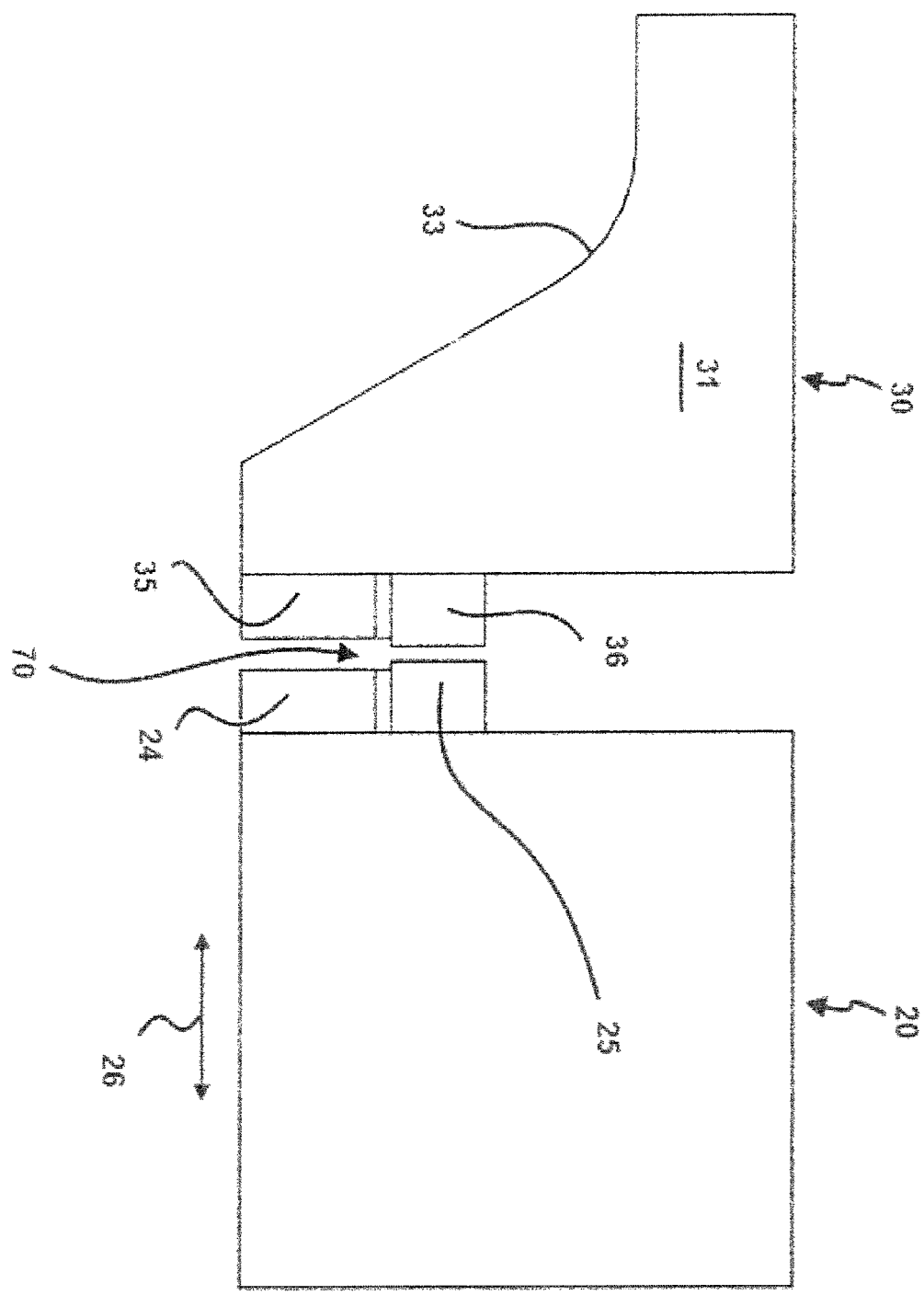

FIGS. 2a and 2b show a second static sealing element 30, which, in contrast to the second sealing element 30 according to the exemplary embodiment of FIG. 1, comprises not just one counterelectrode 32 but two counterelectrode pairs 34, which are arranged on an insulating holder 39 of a pressing bar. Each counterelectrode pair 34 comprises a lower, first counterelectrode 35 and an upper, second counterelectrode 36. As is especially clear in FIG. 2b, the first and second counterelectrodes 35, 36 and the first and second electrodes 24, 25 are arranged symmetrically, so that each vertical surface of a first and second electrode 24, 25 is faced by an equal-sized vertical surface of the first and second counterelectrodes 35, 36.

To ensure that the pressure applied in the sealing region 70 is uniform on all plies of the laminate, the upper, second electrodes 25 project father toward the second sealing element 30. In the embodiment according to FIGS. 2a and 2b, the second counterelectrodes 36 of the counterelectrode pairs 35 also project farther toward the first sealing element 20.

Between the electrodes 24, 25 and the at least one counterelectrode 32, 35, 36, the sealing region 70 for the heat-sealing of multiple plies of the laminate is located. So that heat will be conducted into the sealing ply of the laminate after the multiple plies of the laminate have been pressed together in the sealing region 70, a high-frequency voltage supply 60 (compare FIGS. 5*a*-5*c*) is required, which supplies the electrodes 24, 25 and each counterelectrode (32, 34, 35) with a high-frequency voltage.

Figure 5A:
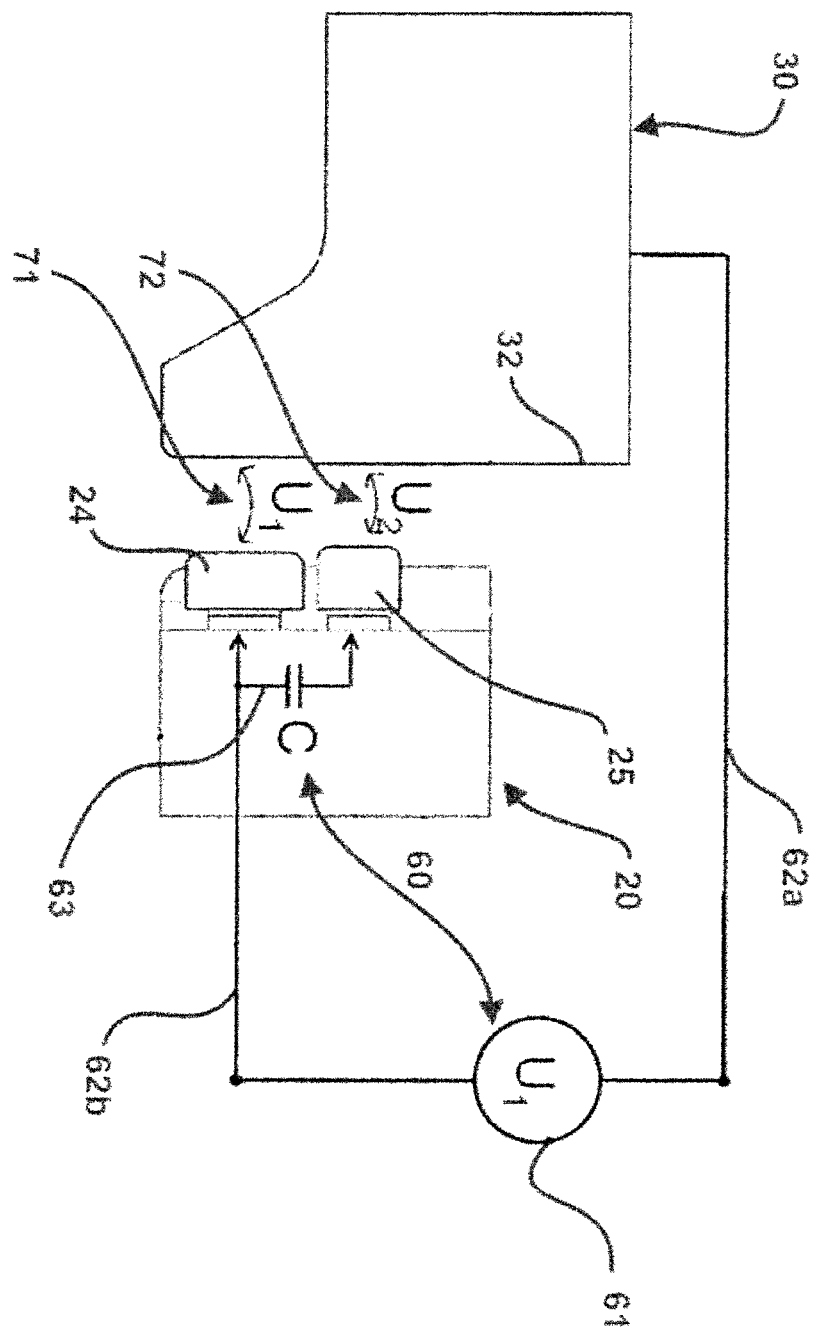
FIGS. 5a-c show different exemplary embodiments of an HF voltage supply of a device according to the invention.

FIG. 5*a* shows a high-frequency voltage supply 60 with an HF generator 61 for generating a high-frequency voltage, which is connected to the single counterelectrode 32 by a first electrical line 62*a* and to the first electrode 24 by a second electrical line 62*b*. In addition, the high-frequency voltage supply 60 comprises a capacitive coupling 63 in the form of a capacitor between the first electrode 24 and the second electrode 25. By this means, the alternating electric field is generated at a higher voltage U1 and thus at a higher HF power level in a first subregion 71 of the sealing region 70 and at a lower voltage U2 and thus at a lower power level in a second subregion 72 of the sealing region 70, so that a differentiated heat distribution is obtained in the subregions 71, 72 of the sealing region 70. In the second subregion 72, as can be seen especially clearly in FIG. 1*b*, a smaller number of plies of the laminate is heat-sealed in the second subregion 72 than in the first subregion 71 of the sealing region.

Figure 5B:
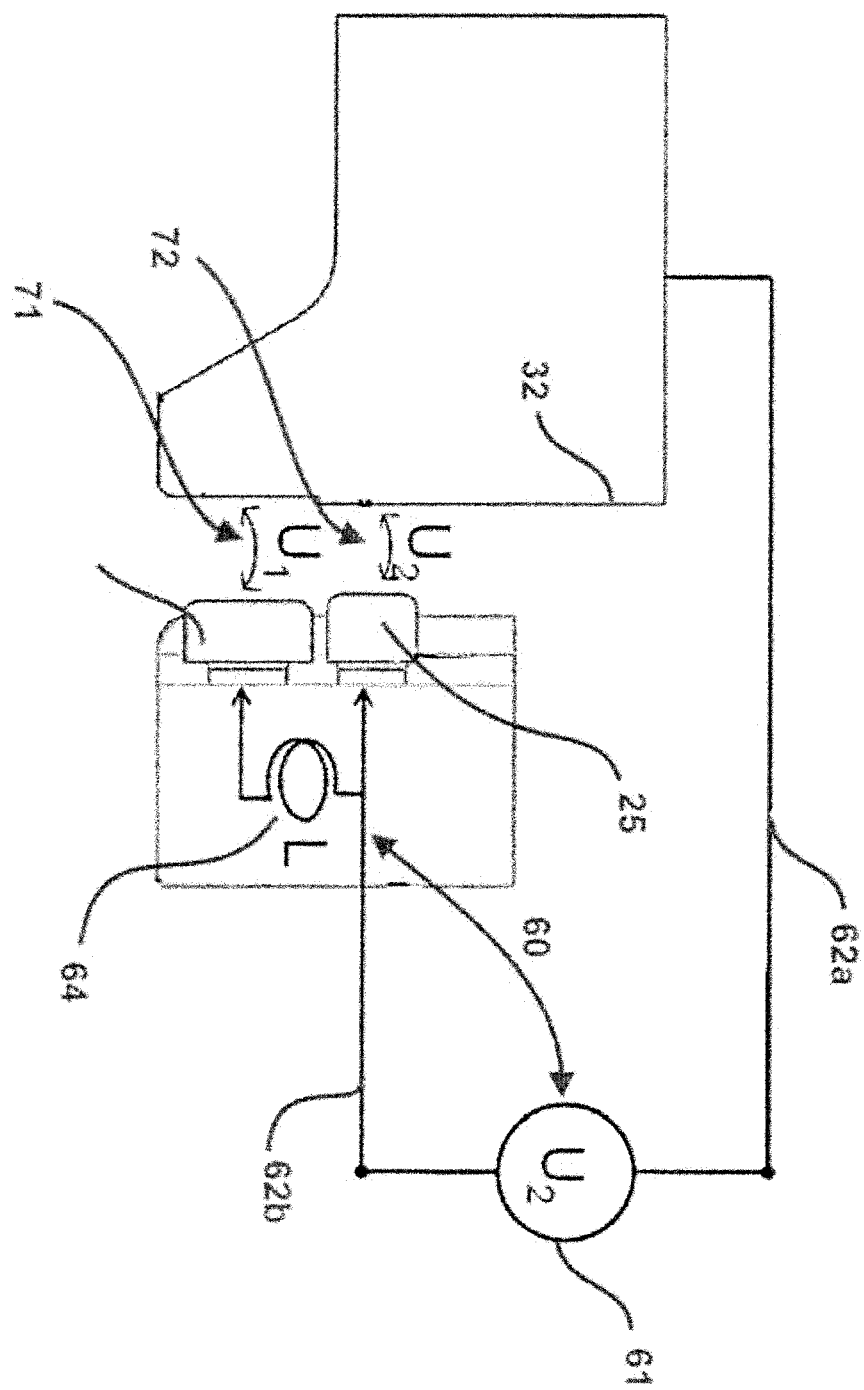

FIG. 5*b* shows an alternative embodiment of a high-frequency voltage supply 60 with an HF generator 61 for generating a high-frequency voltage, which is connected to the single counterelectrode 32 by a first electrical line 62*a* and to the second electrode 25 by a second electrical line 62*b*. In addition, the high-frequency voltage supply 60 comprises an inductive coupling 64 in the form of a coil between the second electrode 25 and the first electrode 24 By this means, the alternating electric field is generated at a lower voltage U2 of the HF generator 61 and thus at a lower HF power level in a second subregion 72 of the sealing region 70 and at a higher voltage U1 and thus at a higher power level in a second subregion 72 of the sealing region 70, so that a differentiated heat distribution is obtained in the subregions (71, 72) of the sealing region 70.

Figure 5C:
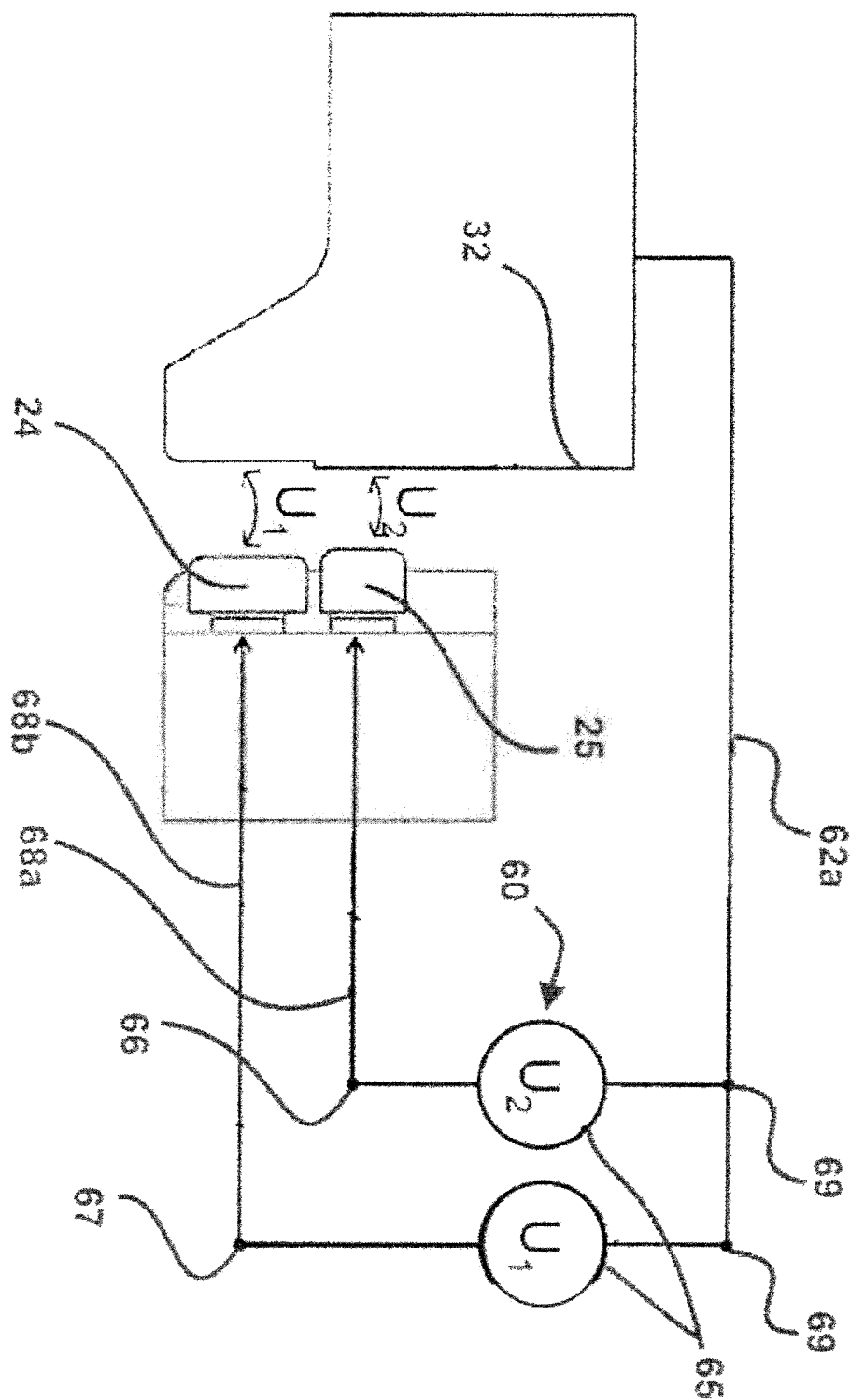

FIG. 5*c* shows another embodiment of a high-frequency voltage supply 60, which comprises an HF generator 65 for generating two HF voltages U1, U2 of different levels. The output terminal 66, which carries the lower voltage U2, is electrically connected directly to the second electrode 25 by a line 68*a*, and the output terminal 67, which carries the higher voltage U1, is electrically connected directly to the first electrode 24 of the first sealing element 20 by a line 68*b*.

Figure 3:
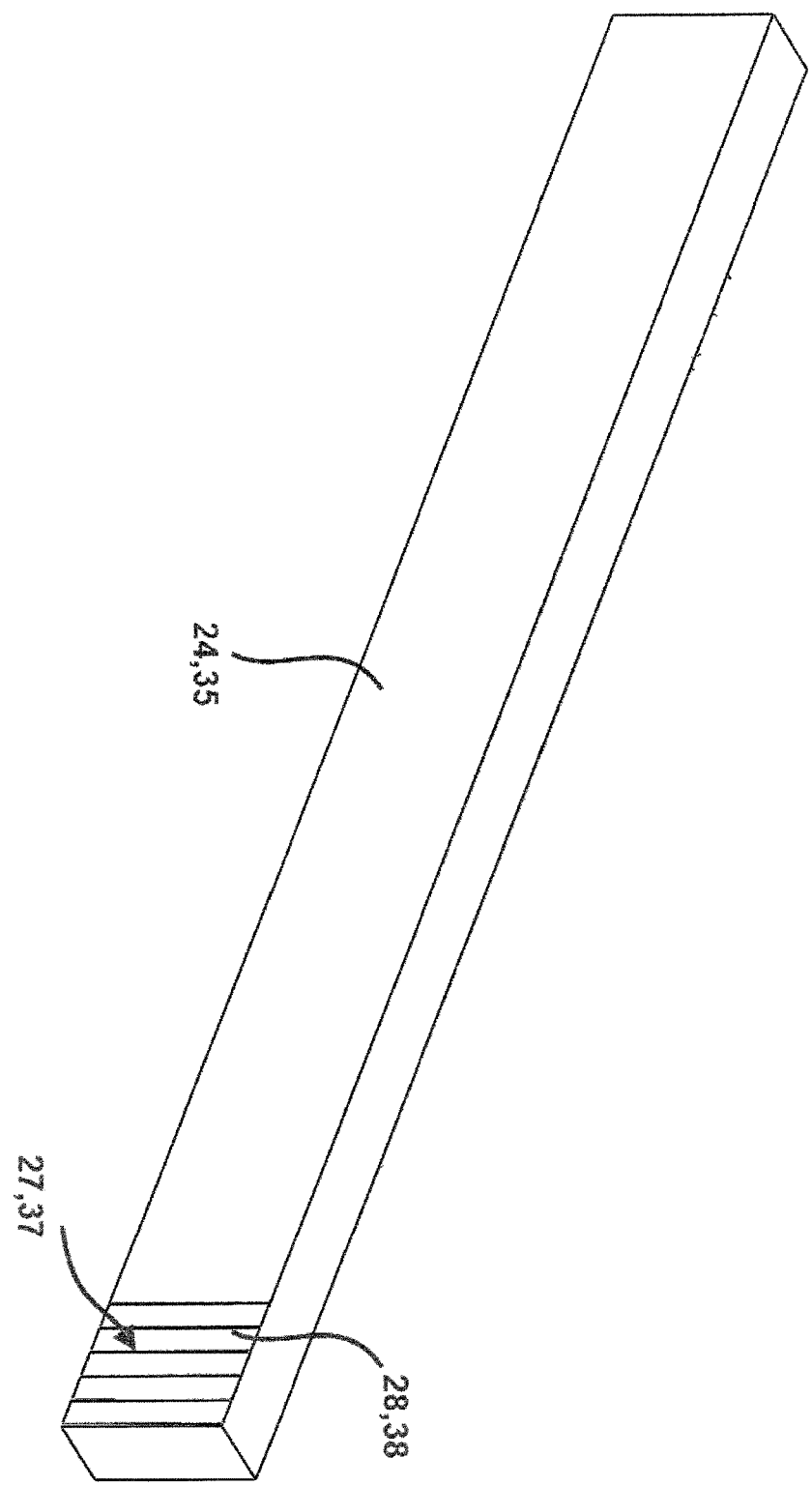
FIG. 3 shows a detailed view of a lower electrode for a sealing element with a vertical structuring.

In one embodiment of the invention, each first electrode 24 and, in the exemplary embodiment according to FIG. 2*a*, also each first counterelectrode 35, comprise a subregion 27, 37 of the surface of the first electrode 24 and of the first counterelectrode 35 which can be brought into contact with the laminates, these subregions being provided with a vertical groove structure 28, 38, which can be seen especially clearly in FIG. 3. The subregions 27, 37 of the first electrode 24 and of the first counterelectrode 35 are arranged face-to-face. The groove structures 28, 38 bring about a local increase in the field concentration of the alternating electric field in the first subregion 71. The groove structures 28, 38 are preferably adapted to the course of the fibers of the laminate.

Figure 4:
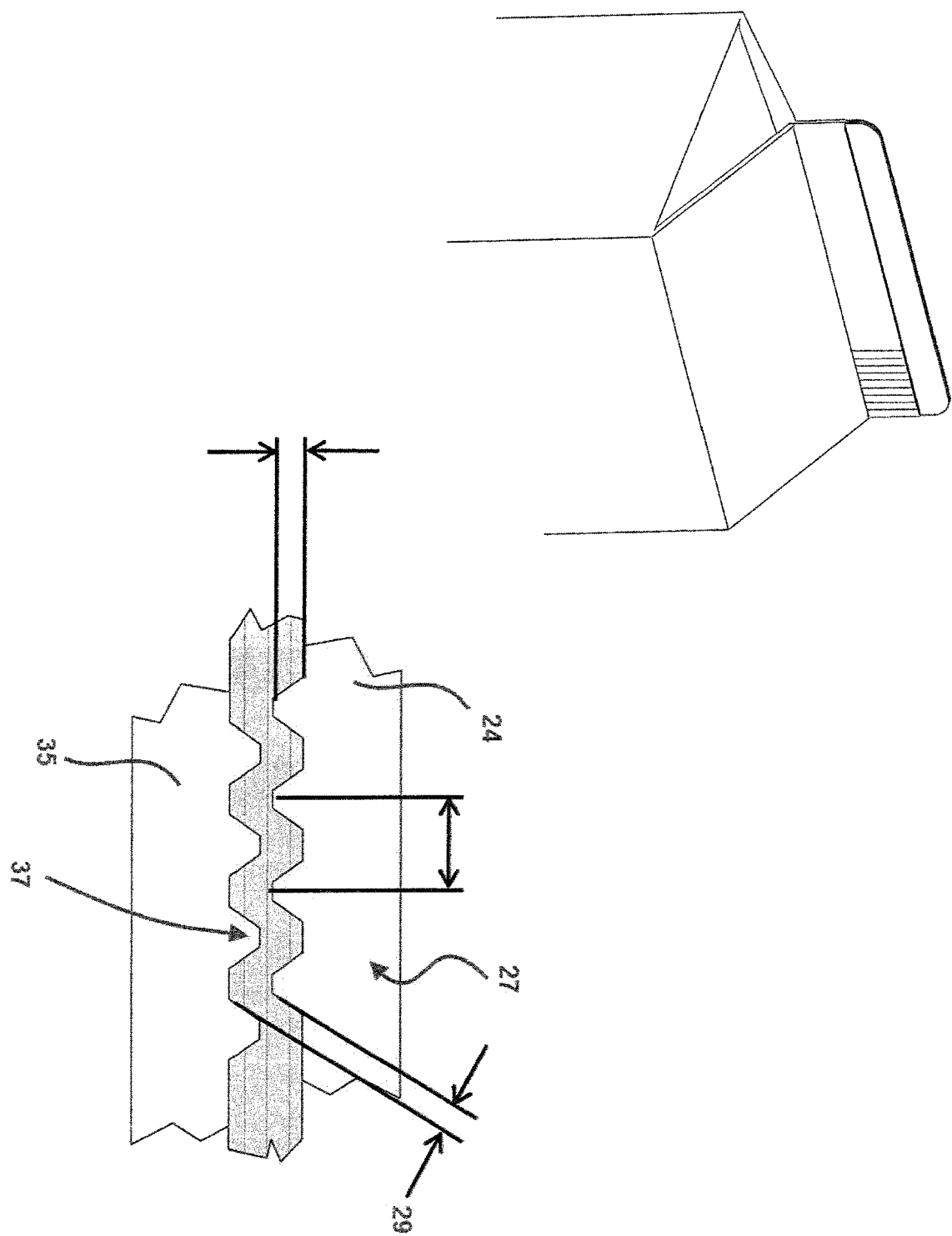
FIG. 4 shows a partial diagram of a top view of two opposing electrodes with a vertical structuring.

The groove structures 28, 38 are arranged on the first electrode 24 and the first counterelectrode 35 in such a way that, when the plies of the laminate are pressed together in the sealing region 70, a residual gap 29 is always present between the opposing structured subregions 27, 37, as can be seen in FIG. 4. The minimum gap 29 ensures that the plies of the laminate are not damaged when they are pressed together. Especially in the case of a laminate with cardboard as carrier material, there is the danger that the fibers of the cardboard can be sheared and torn apart.

Figure 6:
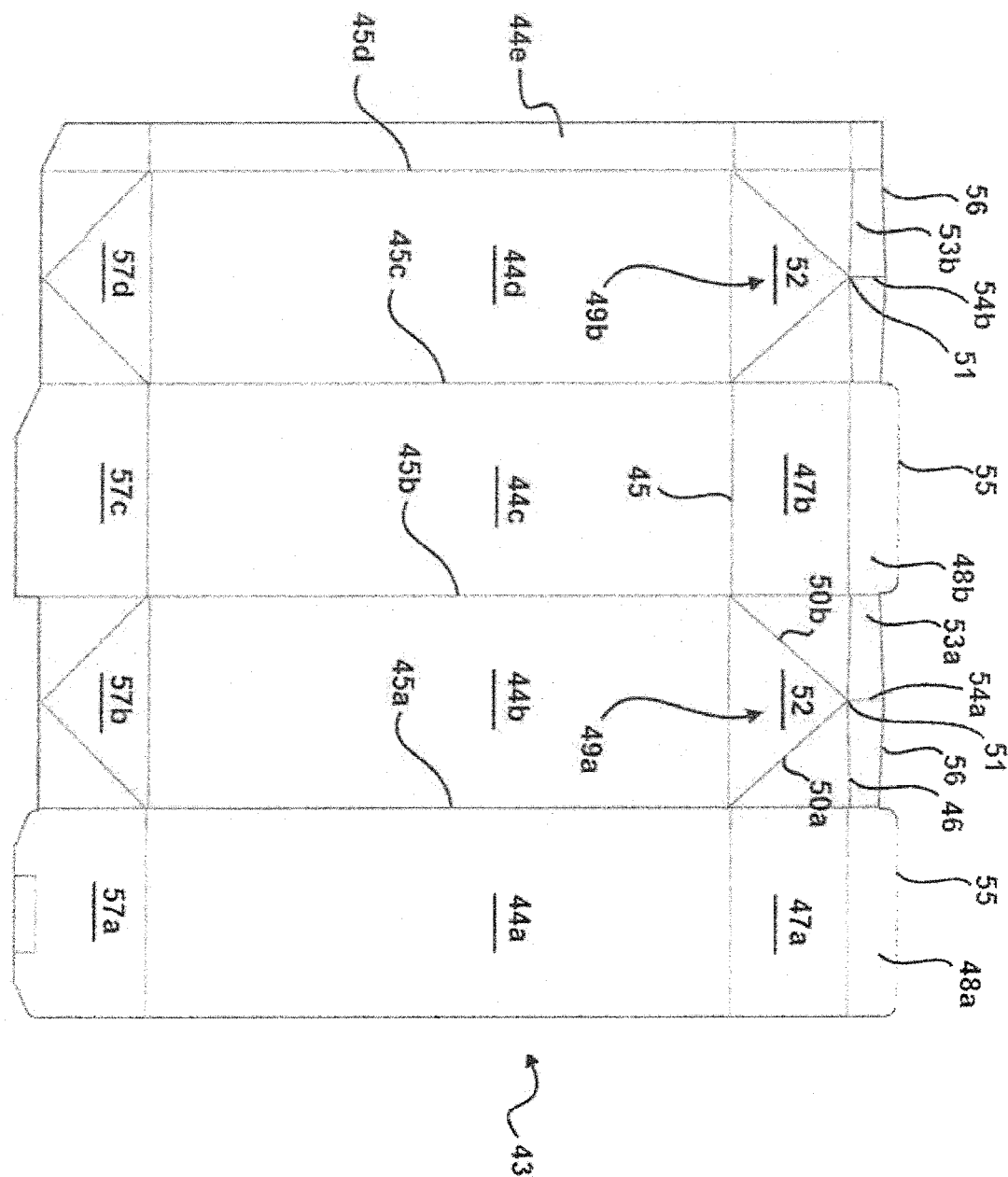
FIG. 6 shows a package blank for the production of a gable top package.

The method according to the invention is used in particular for the heat-sealing of the gable of a gable top package 40 intended to hold liquid food products. Therefore, the layout of a blank 43 for a package jacket for the production of a gable top package 40 of this type will first be explained on the basis of FIG. 6:

The four walls (44*a*-*d*) of the package jacket are welded together over a narrow overlapping area 44*e* extending along one of the four vertical creases and comprise an upper horizontal main crease 45 and, arranged above the main crease 45, a horizontal gable crease 46. The areas of the opposing walls 44*a*, 44*c* of the upright package jacket between the main crease 45 and the gable crease 46 from the roof surface 47*a*, *b* of the gable 41. The two areas of the opposing walls 44*a*, 44*b* above the gable crease 46 form two sealing fins 48*a*, 48*b*.

The areas of the other opposing walls 44*b*, 44*d* between the main crease 45 and the gable crease 46 form the two end surfaces 49*a*, 49*b* of the gable 41. Each end surface 49*a*, *b* comprises two diagonal creases 50*a*, *b*, which proceed from the main crease 45 and come together at a point 51 lying on the gable crease 46, thus forming the outline of a gusset 52. The two areas of the opposing walls 44*b*, 44*d* above the gable crease 46 form two end-surface sealing sections 53*a*, *b*. Each of the two sealing sections 53*a*, *b* is divided by a vertical gable crease 54*a*, *b* into two equal-sized parts. The upper horizontal edge 55 of the two sealing fins 48*a*, *b* projects beyond the upper horizontal edge 56 of the two end-surface sealing sections 53*a*, *b*.

The blank already welded at the wall 44*a* in the overlapping area 44*e* is supplied as a flat, folded package jacket to the magazine of a filling machine for liquid food products. After the flat, folded package jacket has been taken out of the magazine, the package jacket is opened up to form a sleeve with a rectangular cross section. After the bottom surfaces 57*a*, *b* have been used to form the bottom of the container, the gable top package, which is open at the top, is sterilized, and then the container is filled with its intended content. The filled gable top package now arrives in the work area of the device 10 for sealing the gable 41 by heat-sealing.

Between the sealing elements 20, 30, the opposing sealing fins 48*a*, *b* and the two parts of the sealing sections 53*a*, *b* are pressed together in the sealing region 70. The two gussets 52 of the end surfaces 49*a*, *b* of the gable 41 are folded inward around the main crease 45. The laminate for producing the gable top package 40 thus has two plies in the area of the sealing fins 48*a*, projecting above the upper edge 56 of the sealing sections 53*a*, *b*; four plies in the area of the sealing sections 53*a*, *b* between the gable crease 46 and the upper edge 56; and five plies in the overlapping area 44*e* between the gable crease 46 and the upper edge 46.

The area of the laminate with two plies is located in the second subregion 72 of the sealing region 70. The areas with four plies and five plies are located in the first subregion 71 of the sealing region 70.

Because of the arrangement of two electrode pairs 23 on the first sealing element 20, two gable top packages 40 arranged next to each other in the longitudinal direction of the sealing elements 20, 30 can be heat-sealed simultaneously in a single step.

The alternating electric field in the first subregion 71 of the sealing region 70 is generated at a higher power than the alternating electric field in the second subregion 72 of the sealing region 70, where only two plies lie opposite each other. The five plies of the laminate are pressed together in the first subregion 71 by the structured subregions 37, 38 of the electrodes 24, 35 and are heat-sealed there by the locally elevated field concentration. Alternatively, the alternating field could be generated at an even higher power in the region with 5 plies than that in the first subregion 71 in which 4 plies are present in order to introduce more heat effectively there.

After the heat-sealing process, the sealed gable top packages 40 are transported further along in a stepwise manner by a conveyor (not shown) from the sealing region 70 in the conveying direction 73 (compare FIG. 1), until the next two gable top packages 40 arrive between the first and second sealing elements 20, 30 with their gables 41 in the sealing region 70. The previously sealed gable top packages 40 are at this point located in a cooling area 74a, b between the sealing elements 20, 30, in which the previously heat-sealed plies of the laminate are pressed together again. So that the heat can be carried away rapidly, channels for a circulating heat-transfer medium, which are arranged in the first and/or the second sealing element 20, 30, can be provided in the cooling area.

In addition, channels for a circulating heat-transfer medium, which are arranged in the first and/or the second sealing element 20, 30, can be provided in the sealing region 70 for tempering. As a result, during the production of the heat for the heat-sealing process, there is no longer any need to transfer heat unnecessarily from the electrodes to the pressing bars of the sealing elements 20, 30. For this purpose, the sealing region 70 can, for example, be held at a constant temperature of 30° C. Alternatively, an electric resistance heater can be arranged in the pressing bars to preheat them. The cooling area is tempered to, for example, 5° C., so that a rapid cooling effect can be obtained there.

LIST OF REFERENCE NUMBERS

No. Item
10 device
20 first sealing element
21 pressing bar
22 holder
23 electrode pairs
24 first electrode
25 second electrode
26 relative movement
27 subregion
28 groove structure
29 minimum gap
30 second sealing element
31 body
32 counterelectrode
33 recess
34 counterelectrode pairs
35 first counterelectrode
36 second counterelectrode
37 subregion
38 groove structure
39 holder
40 gable top package
41 gable
42 sealing element
43 blank
44a-d walls
44e overlapping area
45a-d vertical crease
46 gable crease
47a-b roof surfaces
48a-b sealing fins
49a-b end surfaces
50a-b diagonal creases
51 point
52 gusset
53a-b sealing sections
54a-b gable crease
55 upper edge
56 upper edge
57a-d bottom surfaces
60 HF voltage supply
61 HF generator
62a-b electrical lines
63 capacitive coupling
64 inductive coupling
65 HF generator
66 output terminal
67 output terminal
68a line
70 sealing region
71 first subregion
72 second subregion
73 conveying direction
74a-b cooling area

The invention claimed is:

1. A method for heat-sealing multiple plies of a laminate in a sealing region, wherein the laminate comprises a carrier layer of electrically nonconductive material and a sealing layer of thermoplastic material on at least one surface of the laminate, comprising the following steps:
pressing the plies of the laminate together in the sealing region; and
generating a high-frequency alternating electric field in the sealing region of the pressed-together plies of the laminate, so that the sealing layer is heated to a molten, fluid state,
wherein the alternating electric field is generated at a first power level in a first subregion of the sealing region and at a second power level different from the first power level in at least one second subregion of the sealing region, thereby obtaining a differentiated heat distribution over the first subregion and second subregion due to a difference between the first power level and the second power level.

2. The method according to claim 1, wherein a number of plies of the laminate heat-sealed in the first region is different from a number of plies of the laminate in the second subregion.

3. The method according to claim 2, wherein the power for generating the alternating electric field in the first subregion and the second subregion is determined as a function of the number and/or thickness of the plies to be heat-sealed in each of the first subregion and the second subregion.

4. The method according to claim 2, wherein the power for generating the alternating electric field in the first subregion and the second subregion is determined as a function of a temperature detected in each of the first subregion and the second subregion during the heat-sealing.

5. The method according to claim 1, wherein a force for pressing the plies of the laminate together is kept constant during the heat-sealing.

6. The method according to claim 1, wherein the plies of the laminate are pressed together with the same applied pressure in each of the first subregion and the second subregion of the sealing region.

7. The method according to claim 1, wherein the high-frequency alternating electric field is generated in a frequency band between 3 MHz and 300 MHz.

\* \* \* \* \*